United States Patent [19]
Shylo

[11] 3,892,929

[45] July 1, 1975

[54] FAULT DETECTOR AND CURRENT LIMITER

[75] Inventor: Paul Shylo, Norridge, Ill.

[73] Assignee: Cook Electric Company, Morton Grove, Ill.

[22] Filed: May 15, 1974

[21] Appl. No.: 470,073

[52] U.S. Cl. ...................... 179/175.3 R; 179/18 FA

[51] Int. Cl. .......................................... H04b 3/46

[58] Field of Search ......... 179/175.3 R, 175, 18 FA; 324/62

[56] References Cited

UNITED STATES PATENTS 3,731,012 5/1973 Shaffer ........................ 179/175.3 R

*Primary Examiner*—Kathleen H. Claffy
*Assistant Examiner*—Douglas W. Olms
*Attorney, Agent, or Firm*—Mason, Kolehmainen, Rathburn & Wyss

[57] ABSTRACT

A fault detector and current limiter for use in E & M telephone trunk circuits includes a normally nonconductive controlled conduction device, which in response to an off-hook signal, is rendered conductive so as to supply a relatively negative potential to an output lead indicative of an off-hook condition of a subscriber's telephone. A current limiter coupled to the normally nonconductive controlled conduction device and to the output lead inhibits the conductivity of the normally nonconductive controlled conduction device in the event an adverse condition occurs on the output lead, such as a short to ground. In response to an on-hook signal, the normally nonconductive controlled conduction device is rendered nonconductive and a normally conductive controlled conduction device is rendered conductive so that a ground potential indicative of an on-hook condition at the subscriber's telephone is applied to the output lead. In the event an abnormal or adverse condition occurs on the output lead, such as a short to battery, another current limiter coupled to the normally conductive controlled conduction device and to the output lead limits the conductivity of the normally conductive controlled conduction device so that the current flowing on the output lead is limited to a safe value.

11 Claims, 3 Drawing Figures

FAULT DETECTOR AND CURRENT LIMITER

The present invention relates to E and M trunk circuits which interconnect telephone central offices and, more particularly, to a new and improved fault detector and current limiter for the output or M lead of E and M trunk circuits.

E and M trunk circuits provide for one way dialing operation between a calling telephone central office and a called telephone central office. The E and M trunk circuits also provide various other supervisory signal outputs. For example, the output or M lead of an outgoing E and M trunk circuit normally is maintained at relatively ground potential during idle conditions. When a calling party goes off-hook, a subscriber's loop is closed such that a loop current flows in the subscriber loop. Whenever a current sensor in the E and M trunk circuit senses this current a fault detector and current limiter applies a relatively negative potential to the output terminal or M lead of the outgoing E and M trunk circuit.

As the calling party dials, the loop current is interrupted at the dial pulse rate. The interruptions in the loop are sensed by the current sensor and the fault detector and current limiter alternately applies the relatively ground and negative potentials to the M lead at the dial pulse rate. In this manner, dial pulses are generated on the M lead of the outgoing E and M trunk circuit, which is transmitted to an incoming E and M trunk circuit at a called telephone central office.

It is necessary to protect the M lead of the E and M trunk circuits from excess current flow on the M lead due to adverse conditions occurring on the M lead, such as a short to ground or a short to battery. In order to protect the M lead from these adverse conditions, ballast lamps have been coupled to the M lead by relays whenever a short to ground or battery occurred on the M lead. When the ballast lamp was so connected to the M lead, the amount of current allowed to flow on the M lead was limited to safe values. However, the ballast lamps generated as much as 25 watts of energy during such conditions. This amount of energy cannot properly be dissipated on printed circuit boards on which E and M trunk circuits are located. Moreover, even though the ballast lamp would limit the current on the M lead to safe values, the current would still increase proportionately to the voltage on the M lead.

Accordingly, the objects of the present invention are to provide a new and improved solid state fault detector and current limiter for E and M trunk circuits that can be utilized on printed circuit boards; that selectively place a relatively ground or negative potential on an M lead of an E and M trunk circuit while limiting the current flow on the M lead during adverse conditions such as a short to ground or battery; that limits the amount of current on the M lead of the E and M trunk circuit without generating an excessive amount of energy; that decreases the amount of current flowing on the M lead of the E and M trunk circuit as the voltage increases due to fault conditions; and that enables the extent to which the current is flowing on the M lead of the E and M trunk circuit to be readily controlled.

In accordance with these and many other objects of the present invention, an embodiment of this invention comprises a fault detector and current limiter for applying a relatively ground or negative potential to an M lead of an E and M trunk circuit which limits the amount of current flowing on the m lead during fault or adverse conditions, such as a short to ground or a short to battery. The fault detector and current limiter includes a normally conductive conduction device through which is applied the ground potential to the M lead. In response to a calling party closing a subscriber loop, the normally conductive conduction device is rendered nonconductive and a normally nonconductive conduction device is rendered conductive so that a relatively negative or battery potential is applied to the M lead. Whenever the negative potential is being applied to the M lead, a first current limiter coupled to the normally nonconductive device and the M lead partially controls the conductivity of the normally nonconductive conduction device. If a fault or adverse condition, such as a short to ground, occurs on the M lead, the first current limiter limits the conductivity of the normally nonconductive conduction device so that the amount of current flowing to the M lead is limited to safe values. Similarly, a second current limiter coupled to the M lead and the normally conductive conduction device limits the conductivity of the normally conductive conduction device and thereby the current flowing on the M lead whenever a ground potential is being supplied to the M lead and the M lead is shorted to battery.

Many other objects and advantages of the present invention will become apparent from considering the following detailed description in conjunction with the drawings in which.

Figure 1:
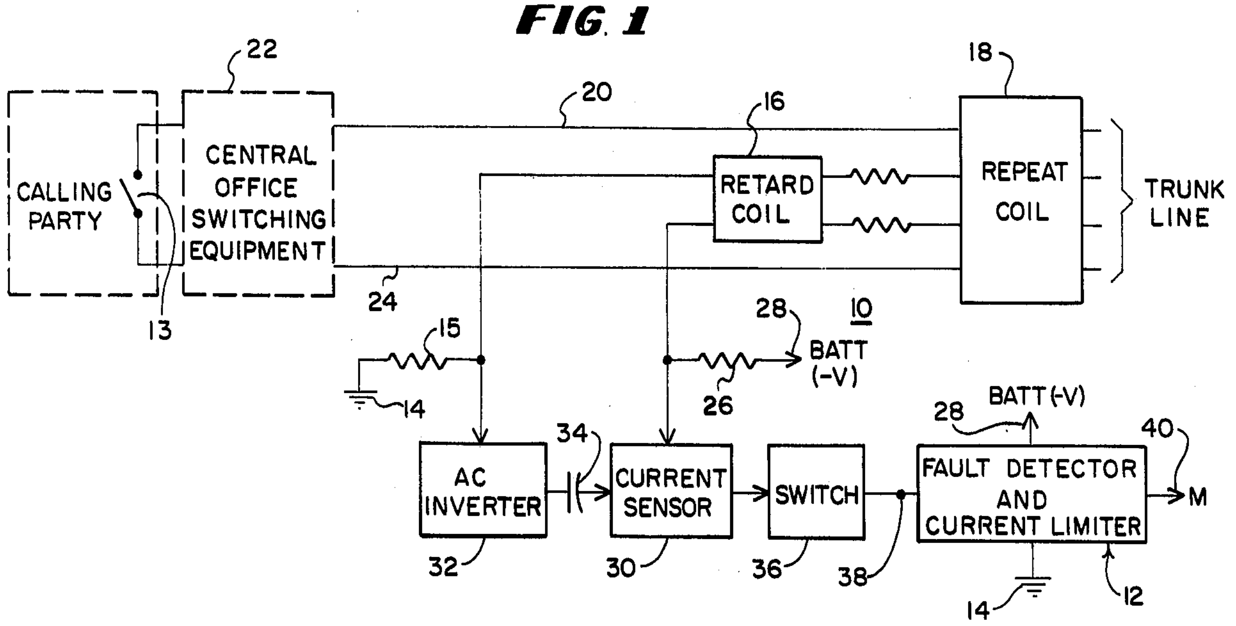
FIG. 1 is a block diagram of a portion of an outgoing E and M trunk circuit for a telephone central office, which includes a fault detector and current limiter embodying the present invention.

Referring now to FIG. 1, therein is disclosed a portion of an outgoing E and M trunk circuit which is generally designated as 10 and which includes a fault detector and current limiter 12 embodying the present invention. When a calling party goes off-hook, the subscriber loop closes, which is diagrammatically represented by the closing of a switch 13. As a result of the closing of the switch 13, a loop current flows from a ground potential terminal 14, through a resistor 15, a portion of a retard coil 16, a portion of a repeat coil 18, a tip line 20 of the loop, central office switching equipment generally designated as 22, the closed switch 13, the telephone central office switching equipment 22, a ring line 24, a second portion of the repeat coil 18, a second portion of the retard coil 16, and a resistor 26 to a central office battery terminal 28, which in the disclosed embodiment is a relatively negative potential such as a negative 48 volts. With the loop current flowing in this manner, a current sensor 30 coupled to the resistor 26 and coupled to the resistor 15 by an AC inverter 32 and a capacitor 34 senses the fact that a loop current is flowing through the resistors 15 and/or 26. A switch 36 then is closed such that a ground potential is applied to the fault detector and current limiter circuit 12.

Whenever the ground potential is applied from the switch 36 to an input terminal 38 of the fault detector and current limiter 12, the generally negative battery potential from the terminal 28 is applied to an M or output lead 40 of the E and M trunk circuit 10. As long as the calling party switch 13 is closed and the loop current is flowing on the subscriber loop, the M lead 40 is maintained at the negative battery potential. In the event that a short to ground occurs on the M lead 40 during this period of time, the fault detector and current limiter 12 limits the amount of current flowing from the battery terminal 28 to the M lead 40 such that excessive current will not flow on the M lead 40.

As the calling party dials, the dial pulses interrupt the loop current at the dial pulse rate. The current sensor 30 detects the fact that the loop current is being interrupted and, by means of the switch 36, applies a generally negative or battery potential to the input terminal 38 of the fault detector and current limiter 12. The fault detector and current limiter 12 than applies a generally ground potential from the ground terminal 14 to the M lead 40. As a result, the fault detector and current limiter 12 alternately places a battery or ground potential on the M lead 40 at the dial pulse rate such that dial pulses are generated on the M lead 40 and transmitted to an incoming E and M trunk circuit at a called telephone central office. Similarly, when the calling party switch 13 is open due to an on-hook condition, the fault detector and current limiter 12 applies the ground potential to the M lead 40.

In the event that a battery is shorted to the M lead 40, the fault detector and current limiter 12 limits the amount of current flowing on the M lead 40 such that excessive amounts of current will not flow on the M lead 40. Accordingly, the fault detector and current limiter 12 not only applies a ground or battery potential to the M lead 40, but also limits the amount of current flow on the M lead 40 whenever an adverse condition occurs.

Figure 2:
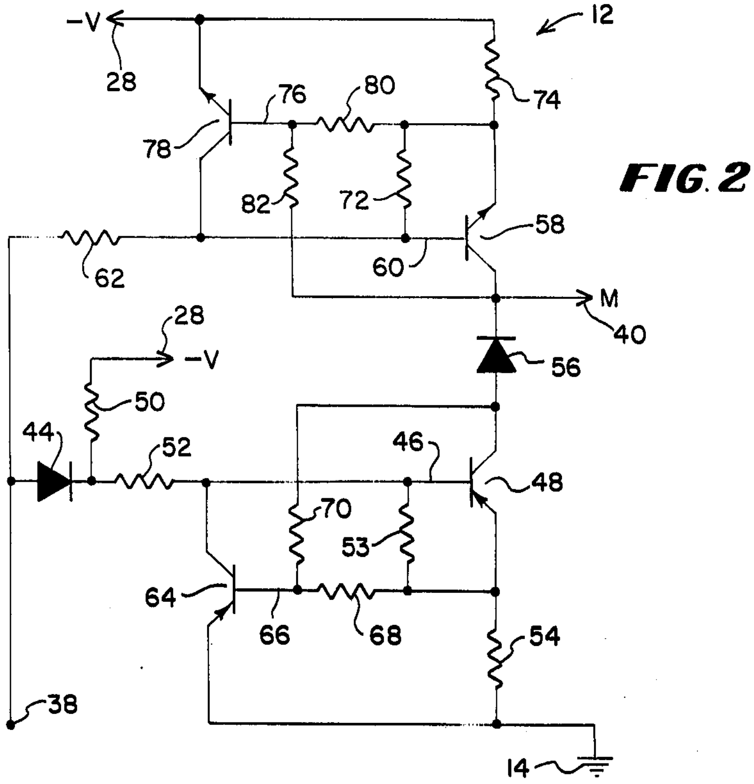
FIG. 2 is a schematic diagram of the fault detector and current limiter embodying the present invention.

More specifically and with reference to FIG. 2, the fault detector and current limiter 12 provides the interconnection of the input terminal 38 to the M or output lead 40 of the E and M trunk circuit 10. Whenever the calling party switch 13 is open or when the loop current is interrupted due to dialing, a generally negative potential is applied to the input terminal 38. With the input terminal 38 at a relatively negative potential, a diode 44 is maintained nonconductive such that a negative biasing potential from the negative battery terminal 28 is applied to a base electrode 46 of a switching transistor 48 by means of resistors 50, 52, 53 and 54. With the negative potential applied to the base electrode 46, the transistor 48 is maintained conductive such that a generally ground potential from the ground terminal 14 is applied to the M lead 40 through the resistor 54, the emitter-collector path of the transistor 48, and a diode 56. In addition, the negative potential applied to the input terminal 38 maintains a second switching transistor 58 nonconductive due to the fact that the negative potential at the input terminal 38 is applied to a base electrode 60 of the transistor 58 through a resistor 62.

As long as an appropriate amount of current is flowing on the M lead 40, a current limiter transistor 64 is maintained nonconductive. However, as the current flowing from the ground terminal 14 to the M lead 40 increases to a specified value due to adverse conditions on the M lead 40, as when the M lead 40 is shorted to battery, the transistor 64 is rendered somewhat conductive because a forward biasing current is applied to a base electrode 66 of the transistor 64 through a resistor 68 as a result of the increased current flow through the resistor 54. The placing of the transistor 64 in this slightly conductive state lowers the biasing potential on the base electrode 46 of the transistor 48 because the base electrode 46 is coupled to the ground terminal 14 through the somehwat conductive emitter-collector path of the transistor 64. By so biasing the transistor 48, the conductivity of the transistor 48 is limited such that the current flowing through the transistor 48 is limited.

As the voltage on the M lead 40 increases, the voltage is applied to the base electrode 66 of the transistor 64 through a resistor 70 such that the transistor 64 is rendered more conductive further limiting the conductivity of the transistor 48 and decreasing the current flow on the M lead 40. This is due to the relatively ground potential from the ground terminal 14 being coupled through the transistor 64 to the base electrode 46. However, since the current flowing through the resistor 54 is being decreased, the transistor 64 is not rendered completely conductive so that the transistor 48 is maintained in a somewhat conductive state allowing a safe value of current to flow on the M lead 40.

When the calling party goes off-hook such that the switch 13 is affectively closed, a ground potential is applied to the input terminal 38 from the switch 36. The diode 44 is rendered conductive such that the ground potential is applied to the base electrode 46 of the transistor 48 through the resistor 52 and the transistor 48 is rendered nonconductive. At the same time, the ground potential at the input terminal 38 is applied to the base electrode 60 of the transistor 58 due to the resistor 62 and resistors 72 and 74, and the transistor 58 is driven into a conductive state. The rendering of the transistor 58 conductive allows the negative battery potential from the terminal 28 to be applied to the M lead 40 through the resistor 74 and the emitter-collector path of the transistor 58. As long as no adverse condition is present on the M lead 40 and the current flowing through the resistor 74 is below a specified value, a base electrode 76 of a current limiter transistor 78 is reversed biased such that the transistor 78 is maintained nonconductive.

However, if the M lead 40 is placed in an adverse condition such as when the M lead 40 is shorted to ground, the current flowing through the resistor 74 increases and the transistor 78 is placed in a somewhat conductive state because of a forward biasing potential being supplied to the base electrode 76 through a resistor 80. A portion of the negative battery potential from the terminal 28 then is applied through the emitter-collector path of the transistor 78 to the base electrode 60 of the transistor 58. The negative potential being supplied to the base electrode 60 through the transistor 78 limits the conductivity of the transistor 58 such that the amount of current flowing from the negative battery terminal 28 through the resistor 74 to the M lead 40 is limited.

As the potential on the M lead 40 increases, it is applied to the base electrode 76 of the transistor 78 by means of a resistor 82. The transistor 78 becomes more conductive thereby further limiting the conductivity of the transistor 58. The rendering of the transistor 58 less conductive further decreases the current flowing to the M lead 40 through the resistor 74. However, this decrease in current flow enables the transistor 78 not to be fully rendered conductive such that the transistor 58 remains somewhat conductive allowing a small, safe value of current to flow on the M lead 40.

Figure 3:
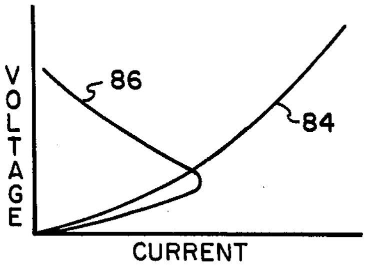
FIG. 3 is a graph illustrating the ability of the fault detector and current limiter to limit the current flowing on an M lead of the E and M trunk circuit as compared to the ability of a ballast lamp to so limit the current.

As previously indicated, the fault detector and current limiter 12 enables unsafe or adverse currents on the M lead 40 to be dissipated without the generation of an abnormally high amount of energy. Thus, unlike a ballast type of current limiter that generates an excessive amount of powder, the fault detector and current limiter 12 can be used on printed circuit boards. Moreover, as indicated in FIG. 3, the ballast lamp current limiter normally allows the current to increase as the voltage on the M lead 40 increases. This general increase of current is represented by a curve designated as 84 in FIG. 3. Advantageously, with the fault detector and current limiter 12 of the present invention, as the voltage increases on the M lead 40, a reverse biasing potential is applied to the switching transistor 48 or the switching transistor 58 by the current limiter transistors 64 and 78, respectively. Therefore, as the voltage on the M lead increases, the current reaches a desired maximum value and then is decreased as indicated by a second curve 86 in FIG. 3. The slope of the curve 86 or the rate at which the current decreases due to the increase of voltage on the M lead 40 is determined by the resistor 70 or 82 coupled between the current limiter transistors 64 and 78, respectively, and the M lead 40.

Although the present invention is described with reference to several illustrative embodiments thereof, it should be understood that numerous other modifications and embodiments of the invention can be devised by those skilled in the art that will fall within the spirit and scope of the principles of this invention.

What is claimed and desired to be secured by Letters Patent of the United States is:

1. A fault detector and current limiter having an input terminal and an output terminal and being responsive to an input signal to supply an output potential from a potential source to said output terminal, said fault detector and current limiter comprising:

a first controlled conduction means operable in response to said input signal at said input terminal to supply said output potential to said output terminal, a first current limiter means coupled to said first controlled conduction means and said potential source, said first current limiter means inhibiting the first controlled conduction means from supplying said output potential when the current through said first controlled conduction means rises above a specified magnitude, and coupling means coupling said first current limiter means to said output terminal whereby said current limiter means further inhibits said first controlled conduction means in response to the potential at said output terminal.

2. The fault detector and current limiter as set forth in claim 1 wherein said first controlled conduction means has a first control electrode and a pair of first output electrodes and said first current limiter means has a second control electrode and a pair of second output electrodes, said pair of first output electrodes being coupled between said potential source and said output terminal and said first control electrode being coupled to said input terminal, said second control electrode being coupled to the one of said first output electrodes coupled to said potential source and being coupled to said output terminal by said coupling means, and said pair of second output electrodes being coupled between said potential source and said first control electrode.

3. The fault detector and current limiter as set forth in claim 1 wherein said input signal is generated as a result of a loop current flowing in a telephone line so that said supplying of said output potential to said output terminal is indicative of the loop current flowing on the telephone line.

4. A fault detector and current limiter having an input to receive first and second input signals and supplying to an output first and second output potentials from first and second potential sources, respectively, said fault detector and current limiter comprising:

a first normally nonconductive conduction means coupled to said input and coupled between said first potential source and said output, said first normally nonconductive conduction means being maintained nonconductive in response to said input receiving said second input signal and being rendered conductive in response to said input receiving said first input signal so as to supply said first output potential to said output, a second normally nonconductive conduction means coupled to said first potential source and to said first normally nonconductive conduction means, said second normally nonconductive conduction means being rendered somewhat conductive in response to excessive current flow through said first normally nonconductive means such that said second normally nonconductive conduction means limits the conductivity of said first normally nonconductive conduction means so as to limit said excessive current flow, a normally conductive conduction means coupled to said input and between said second potential source and said output, said normally conductive conduction means being rendered nonconductive in response to said input receiving said first input signal and being maintained conductive when said input receives said second input signal so as to supply said second output potential to said output, and a third normally nonconductive conduction means coupled to said normally conductive conduction means and said second potential source, said third normally nonconductive conduction means being rendered somewhat conductive in response to current flow through said normally conductive conduction means attaining a specified value so as to inhibit the conductivity of the normally conductive conduction means and thereby limiting the current flow through the normally conductive conduction means.

5. The fault detector and current limiter as set forth in claim 4 including a first coupling means coupled between said second normally nonconductive conduction means and said output, and a second coupling means coupled between said third normally nonconductive conduction means and said output.

6. The fault detector and current limiter as set forth in claim 4 including a first rectifier means coupling said normally conductive conduction means to said input, and a second rectifier means coupling said normally conductive conduction means to said output.

7. The fault detector and current limiter as set forth in claim 4 wherein said first input signal is received at said input when a loop current is flowing on a telephone loop and said second input signal is received at said input whenever said loop current is interrupted such that said first and second output potentials are indicative of the flow of said loop current on said telephone loop.

8. A fault detector and current limiter having an input to receive first and second input signals and supplying to an output first and second output potentials from first and second potential sources, respectively, said fault detector and current limiter comprising:

a first switching means coupled to said input and coupled between said first potential source and said output, said first switching means coupling said first potential source to said output in response to said input receiving said first input signal, a first current limiter means coupled to said first switching means, said first current limiter means inhibiting the coupling of said first potential source to said output whenever an excessive current flow occurs at the output, a second switching means coupled to said input, said second switching means coupling said second potential source to said output in response to said input receiving said second input signal, and a second current limiter means coupled to said second switching means, said second current limiter means inhibiting said second switching means from coupling said second potential source to said output whenever an adverse condition occurs on said output.

9. The fault detector and current limiter as set forth in claim 8 including a first coupling means coupled between said first current limiter means and said output, and a second coupling means coupled between said second current limiter means and said output.

10. The fault detector and current limiter as set forth in claim 5 wherein said first coupling means includes at least a first resistor and said second coupling means includes at least a second resistor.

11. The fault detector and current limiter as set forth in claim 9 wherein said first coupling means includes at least a first resistor and said second coupling means includes at least a second resistor.

* * * * *